US010036881B2

(12) United States Patent
Schweitzer

(10) Patent No.: US 10,036,881 B2
(45) Date of Patent: Jul. 31, 2018

(54) DIGITAL MICROSCOPE SYSTEM FOR A MOBILE DEVICE

(71) Applicant: PATHONOMIC, San Jose, CA (US)

(72) Inventor: Marc Schweitzer, San Jose, CA (US)

(73) Assignee: PATHONOMIC, San Jose, CA (US)

( * ) Notice: Subject to any disclaimer, the term of this patent is extended or adjusted under 35 U.S.C. 154(b) by 0 days.

(21) Appl. No.: 15/302,189

(22) PCT Filed: May 26, 2015

(86) PCT No.: PCT/US2015/032495
§ 371 (c)(1),
(2) Date: Oct. 6, 2016

(87) PCT Pub. No.: WO2015/179876
PCT Pub. Date: Nov. 26, 2015

(65) Prior Publication Data
US 2017/0068084 A1 Mar. 9, 2017

Related U.S. Application Data

(60) Provisional application No. 62/002,263, filed on May 23, 2014.

(51) Int. Cl.
G02B 21/36 (2006.01)
G02B 21/00 (2006.01)
(Continued)

(52) U.S. Cl.
CPC ....... *G02B 21/361* (2013.01); *G02B 21/0008* (2013.01); *G02B 21/025* (2013.01);
(Continued)

(58) Field of Classification Search
CPC .................. G02B 21/361; G02B 21/0008; G02B 21/025; G02B 21/082; G02B 21/242;
(Continued)

(56) References Cited

U.S. PATENT DOCUMENTS 4,962,986 A 10/1990 Hompel et al.
5,416,511 A 5/1995 Ishikawa et al.
(Continued)

FOREIGN PATENT DOCUMENTS

EP 0401432 A1 12/1990
KR 20140003794 A * 1/2014
(Continued)

*Primary Examiner* — Frank Font
(74) *Attorney, Agent, or Firm* — Avery N. Goldstein; Blue Filament Law, PLLC

(57) ABSTRACT

A digital microscope system configured for use with the built in camera of a mobile device is provided. The digital microscope system has a lens and an advanced lighting system incorporated into a case designed to fit a particular mobile device, where the case positions the optics of the case over the lens of the built in camera and the camera built in flash. When combined with an application program (app) running on the mobile device held within the case, the optics of the case combined with the built in camera of the mobile device becomes a powerful digital microscope with a user adjustable magnification. In a specific embodiment the adjustable magnification ranges from 1× up to 200× optical magnification.

19 Claims, 3 Drawing Sheets

(51) Int. Cl.
- *H04N 5/232* (2006.01)
- *G02B 21/08* (2006.01)
- *G02B 21/24* (2006.01)
- *H04N 5/225* (2006.01)
- *G02B 21/33* (2006.01)
- *G02B 21/02* (2006.01)
- *H04M 1/02* (2006.01)
- *H04M 1/21* (2006.01)

(52) U.S. Cl.
CPC ......... *G02B 21/082* (2013.01); *G02B 21/242* (2013.01); *G02B 21/33* (2013.01); *G02B 21/36* (2013.01); *G02B 21/362* (2013.01); *G02B 21/365* (2013.01); *H04M 1/0254* (2013.01); *H04M 1/21* (2013.01); *H04N 5/2254* (2013.01); *H04N 5/2256* (2013.01); *H04N 5/2257* (2013.01); *H04N 5/23212* (2013.01); *H04N 5/23216* (2013.01); *H04N 5/23296* (2013.01); *H04M 1/0264* (2013.01)

(58) Field of Classification Search
CPC ...... G02B 21/33; G02B 21/36; G02B 21/362; G02B 21/365; H04M 1/0254; H04M 1/21; H04N 5/2254; H04N 5/2256; H04N 5/2257; H04N 5/23212; H04N 5/23216; H04N 5/23296
USPC .................................. 359/368, 390
See application file for complete search history.

(56) References Cited

U.S. PATENT DOCUMENTS

| | | |
|---|---|---|
| 5,442,489 A | 8/1995 | Yamamoto et al. |
| 5,687,259 A | 11/1997 | Linford |
| 6,063,024 A | 5/2000 | Yamamoto |
| 7,006,223 B2 | 2/2006 | Mullani |
| 7,027,153 B2 | 4/2006 | Mullani |
| 7,167,243 B2 | 1/2007 | Mullani |
| 7,167,244 B2 | 1/2007 | Mullani |
| 7,551,278 B2 | 6/2009 | Cole |
| 9,154,594 B2 * | 10/2015 | Fletcher ............ G02B 21/0008 |
| 9,839,352 B2 * | 12/2017 | Wallace ............... A61B 3/107 |
| 9,857,666 B2 * | 1/2018 | Coppage ............. G03B 17/561 |
| 2009/0093274 A1 | 4/2009 | Yamamoto |
| 2009/0181729 A1 | 7/2009 | Griffin, Jr. et al. |
| 2011/0085032 A1 * | 4/2011 | Kim ................... G02B 21/0008 348/79 |
| 2011/0234757 A1 * | 9/2011 | Zheng ................... G02B 21/36 348/46 |
| 2011/0292198 A1 | 12/2011 | Lapstun et al. |
| 2011/0292199 A1 | 12/2011 | Lapstun et al. |
| 2011/0294543 A1 | 12/2011 | Lapstun et al. |
| 2012/0236425 A1 | 9/2012 | O'Neill |
| 2013/0286226 A1 | 10/2013 | Baum et al. |
| 2014/0267670 A1 * | 9/2014 | Tipgunlakant ....... G02B 21/361 348/79 |
| 2014/0362283 A1 * | 12/2014 | Coppage ............. G03B 17/561 348/373 |
| 2015/0036043 A1 * | 2/2015 | Markovic ........... G02B 21/362 348/373 |
| 2015/0043061 A1 * | 2/2015 | Cho ....................... G02B 21/24 359/363 |
| 2017/0032285 A1 * | 2/2017 | Sharma .................... G06N 3/08 |
| 2017/0299435 A1 * | 10/2017 | Rhoads ................. G01J 3/2823 |

FOREIGN PATENT DOCUMENTS

| | | |
|---|---|---|
| WO | 0011451 A1 | 3/2000 |
| WO | 0135827 A1 | 5/2001 |
| WO | 0167956 A2 | 9/2001 |
| WO | 2006083081 A1 | 8/2006 |
| WO | 2012058641 A2 | 5/2012 |
| WO | 2013028972 A1 | 2/2013 |
| WO | 2013113760 A1 | 8/2013 |
| WO | 2013162711 A1 | 10/2013 |

\* cited by examiner

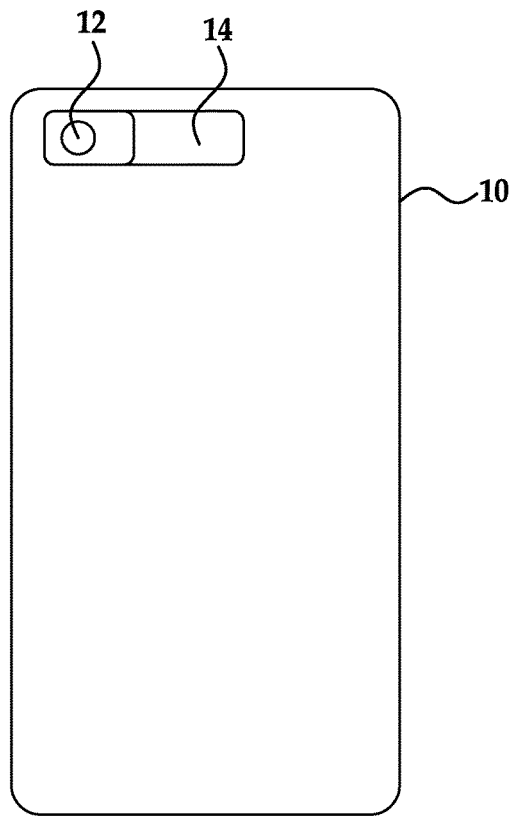
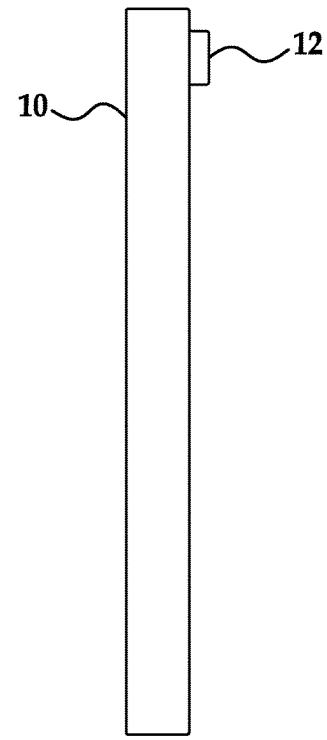
FIG. 1A　　　　　　　FIG. 1B
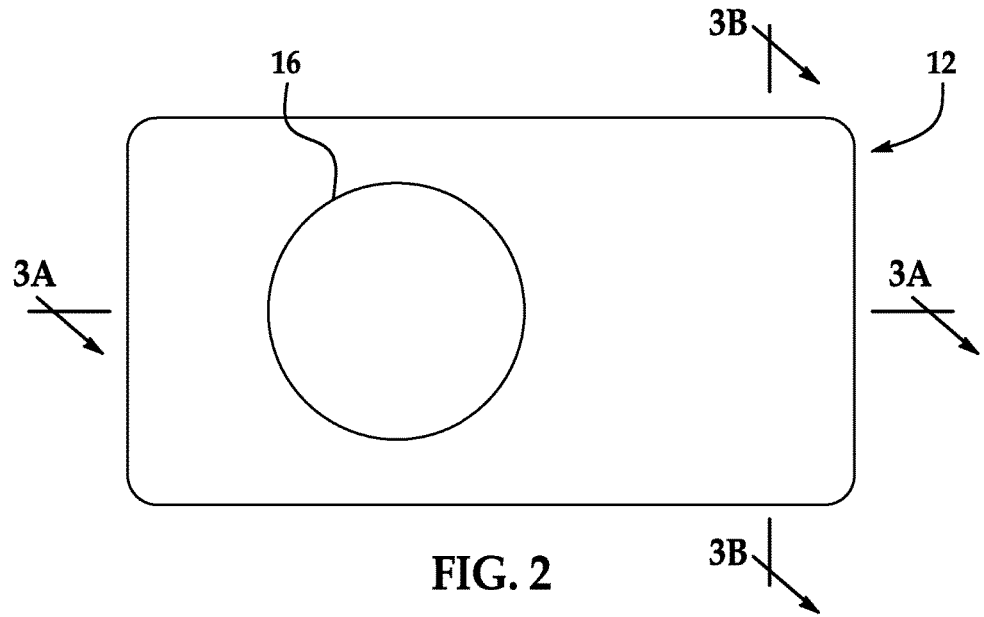
FIG. 2

DIGITAL MICROSCOPE SYSTEM FOR A MOBILE DEVICE

CROSS REFERENCE TO RELATED APPLICATIONS

This application claims priority benefit of U.S. Provisional Application Ser. No. 62/002,263 filed 23 May 2014; the contents of which are hereby incorporated by reference.

FIELD OF THE INVENTION

The present invention in general relates to the field of microscopy and in particular to a microscope system for use with the built in camera of a mobile device.

BACKGROUND OF THE INVENTION

Handheld devices, such as mobile phones and tablets have become commonplace in society. Nearly all mobile phones and tablets are equipped with a camera that is capable of taking still pictures and moving images. In addition to the original equipment camera found on the handheld devices, there are also many aftermarket products that augment the operation of the camera including telephoto lenses and microscope attachments that fit over, or attach to the handheld device.

However, in the typical handheld optical systems where a close-up or magnified image is taken, there is a tradeoff between holding the optical system at the optimal focal length and keeping the handheld steady enough to take a blur free picture, especially at high magnification. Often there is also a challenge to correctly light the field of view as the objective lens needs to be closer to the area to be imaged leaving little room to fit light sources.

Thus, while there are many aftermarket products for obtaining close-up and magnified images with handheld cameras, there exists a need for an optical system that can improve on the image quality of close-up and magnified images obtained with handheld devices

SUMMARY OF THE INVENTION

A digital microscope system for use with a mobile device is provided. The digital microscope system includes a case configured to fit on the mobile device, a microscope module with a movable slide connection to the case, and wherein the case positions the microscope module in a first position over a camera and a light source built-in the mobile device, and away from the camera and the light source in a second position.

A method of using the digital microscope system locating a surface to be imaged is provided. The method includes applying a fluid interface between the microscope module and the surface to be imaged; placing the microscope module on the surface; and taking an image of the surface.

BRIEF DESCRIPTION OF THE DRAWINGS

The present invention is further detailed with respect to the following drawings. These figures are not intended to limit the scope of the present invention but rather illustrate certain attributes thereof.

FIGS. 1A and 1B are front and side views of the inventive mobile device case with the slideable microscope module installed according to embodiments of the invention;

FIG. 2 is a top close up view of the microscope module and is shown without the slide mechanism attached and semitransparent for clarity according to an embodiment of the invention;

DESCRIPTION OF THE INVENTION

Figure 3A:
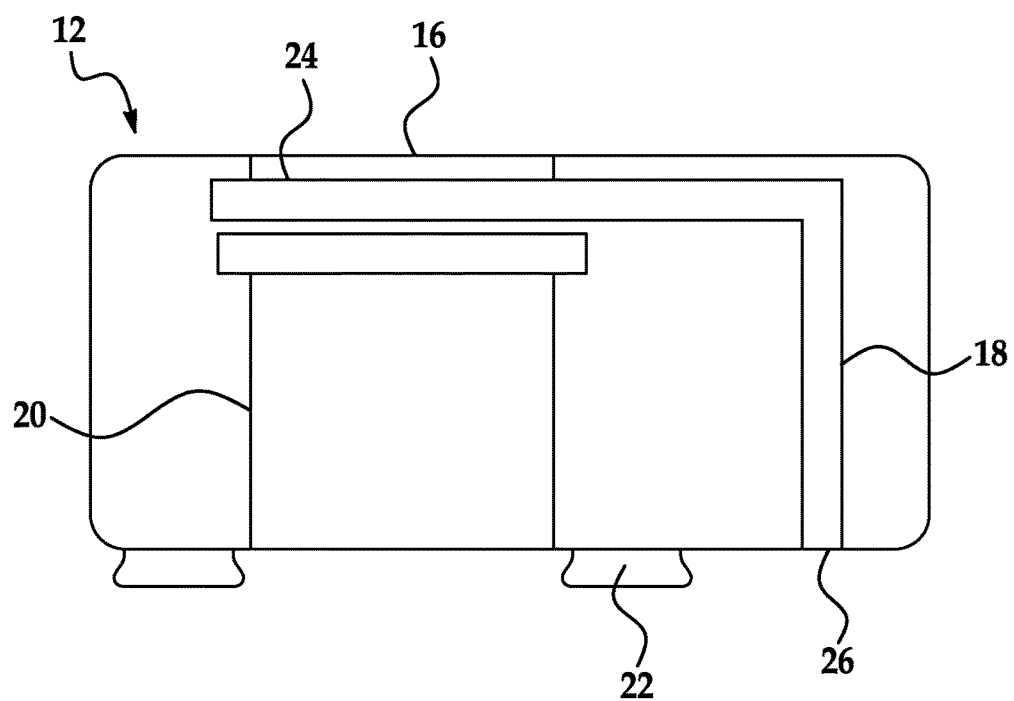
FIGS. 3A and 3B are cross-sectional views of FIG. 2 along lines A-A and B-B, respectively, according to an embodiment of the invention.

The present invention has utility as a digital microscope system configured for use with the built in camera of a mobile device. Examples of mobile devices include, but are not limited to, handheld smartphones and tablets. Embodiments of the inventive microscope system have a lens and an advanced lighting system incorporated into a case designed to fit the particular mobile device, where the case positions the optics of the case over the lens of the built in camera and the camera built in flash. When combined with an application program (app) running on the mobile device held within the case, the optics of the case combined with the built in camera of the mobile device becomes a powerful digital microscope with a user adjustable magnification. In a specific embodiment the adjustable magnification ranges from 1× up to 200× optical magnification.

While embodiments of the inventive digital microscope can be used for a variety of uses, it is especially suited to clinical dermatoscopy. Embodiments of the inventive system permit the observation, image capture and simultaneous storage of patient image data with a single touch of a user interface on the mobile device. Each picture can be emailed or deposited in a secure electronic data management system. With a simple setup in the accompanying app before the examination, multiple repetitive steps may be combined together so that when the clinician takes a picture, patient ID tags can be automatically added to every image file name captured during that examination, as well as relevant patient notes that can automatically be sent to the clinicians electronic data management system without any additional input required. The clinician has the option of sliding the microscope lens module in front of the built in mobile device camera with one finger, which allows normal camera images to be taken of the general area of interest along with the detailed microscopic examination using the optical system of the case without having to remove the mobile device out of the case. In a specific embodiment, an advanced camera zoom option allows the clinician to zoom in on any object in the image rather than just the center. In a specific embodiment, both full auto and manual focus options are available. In a specific embodiment, a calibrated reticle in the microscope optics allows direct measurement scale with every picture.

Embodiments of the inventive optical system address the problems encountered with typical existing handheld systems where there is a tradeoff between holding the optical system at the optimal focal length and keeping device steady enough to take a blur free picture, especially at high magnification. Often there is also a challenge to correctly light the field of view as the objective lens needs to be closer to the area to be imaged leaving little room to fit light sources. These problems are addressed by the inventive optical system, where the optics are designed to rest directly on the area to be imaged. The ability to place the optics directly on the area to be imaged eliminates the need for the clinician to steady the imaging device while holding the device at the correct focal length.

Furthermore, since the inventive optical system and case rests on and is stabilized by the surface to be imaged, the clinician needs just one hand to loosely support the device and snap a picture leaving their other hand free to steady the subject or grasp additional instrumentation. The application program (app) running on the mobile device held within the case, provides advanced camera control features that can also be accessed with the same hand that holds the mobile device within the case.

By designing the optics that directly contact the surface to be imaged; the objective lens can be designed substantially smaller than competing products without compromising image quality. Embodiments of the lens system are optimized to minimize chromatic aberration and other distortion. The advanced optical design ensures easy focus, consistent illumination and excellent picture quality even at high magnification. The optics in contact with the surface may be protected from abrasion and daily use by a scratch resistant cover, such as for example a sapphire coverglass with a hardness approaching that of diamonds.

The ability of the inventive optical system to light the subject area with zero clearance is accomplished with a novel "lightbending" apparatus. The inventive lightbending apparatus combines a solid light channelling device with a fluid interface to direct light in a unique way. In embodiments of the system, light from the mobile device LED itself, which typically serves as the flash, is channeled into a light pipe that couples directly with the sapphire cover glass. In an embodiment the light pipe may be made of a polycarbonate material. A droplet of clear refractive index matched liquid (such as water or ultrasound gel) placed between the patient skin and the sapphire cover glass directs the light to effectively and uniformly illuminate the field of view. A surprising result of the use of the optical system with the clear refractive index matched liquid is the ability to take advantage of the translucency of skin by allowing observation of features below the surface of the skin such as melanin and near surface vascular structures. This feature may be important for the early diagnosis of certain skin diseases that may not present themselves at the outermost epidermal layer in the early stages of development.

A further advantage provided by embodiments of the inventive digital microscope system is that it requires no external light or battery source. This means that there is no additional hardware required to support the digital microscope system. The clinician just charges their mobile device as usual. When used under normal clinical conditions, the impact to the battery life of the mobile device will be negligible.

The inventive case that holds the sliding optical components is also designed to protect the underlying mobile device and may be made of a tough plastic such as acrylonitrile butadiene styrene plastic (ABS) material or a composite material. Furthermore, exposed components are designed for frequent alcohol rub down in between patients. In some inventive embodiments, a disposable plastic sanishield enclosures are also to inhibit pathogen transmission between various subjects imaged with an inventive system. The ultra-compact design of the case allows handheld smartphones to fit in a shirt pocket or otherwise be handled and stored like a conventional smart phone or tablet device.

Referring now to the figures, FIGS. 1A and 1B are front and side views, respectively, of the inventive mobile device case 10 with the slideable microscope module 12 (shown semi-transparent for clarity) installed according to embodiments of the invention. The microscope module 12 slides to position 14 on the slide mechanism to reveal the built in camera of the encased mobile device. As seen in FIG. 1B, the microscope module 12 has a low profile, with smooth corners to prevent injuring a patient.

Figure 3B:
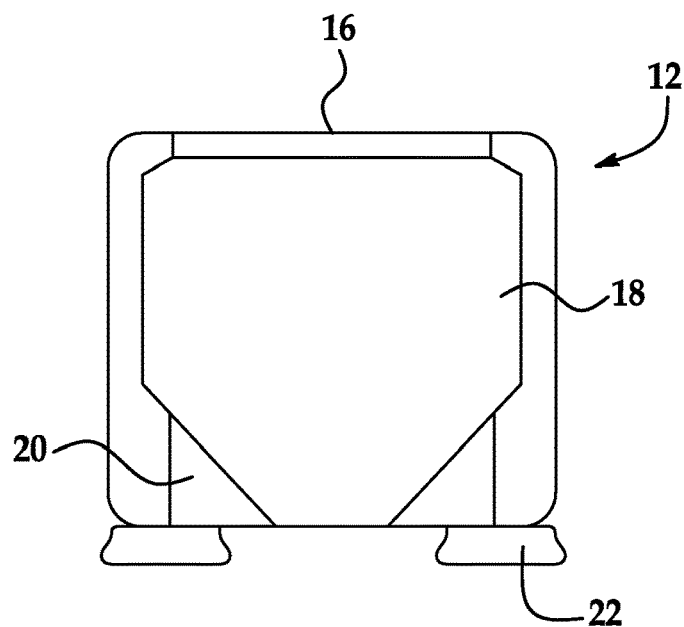

FIG. 2 is a top close up view of the microscope module 12 and is shown without the slide mechanism attached and is semitransparent for clarity according to an embodiment of the invention. Scratch resistant window 16 is positioned above the camera (not shown) of the handheld device. FIGS. 3A and 3B are cross-sectional views of FIG. 2, and show the lens barrel 20 centered and positioned under the scratch resistant window 16. When in microscope mode, the lens barrel 20 is positioned over the camera lens of the mobile device. A felt like light excluder ring 22 keeps unwanted light from entering at the sliding interface between the lens barrel 20 and camera, and prevents scratching of the camera lens due to the back and forth sliding motion of the microscope module 12. A light pipe 18 has a proximal end 24 and a distal end 26, with the proximal end 24 located between the lens barrel 20 and scratch resistant window 16. The distal end 26 is configured to be positioned above the camera LED (flash) of the mobile device, so as to provide light to the area to be imaged.

Figure 4:
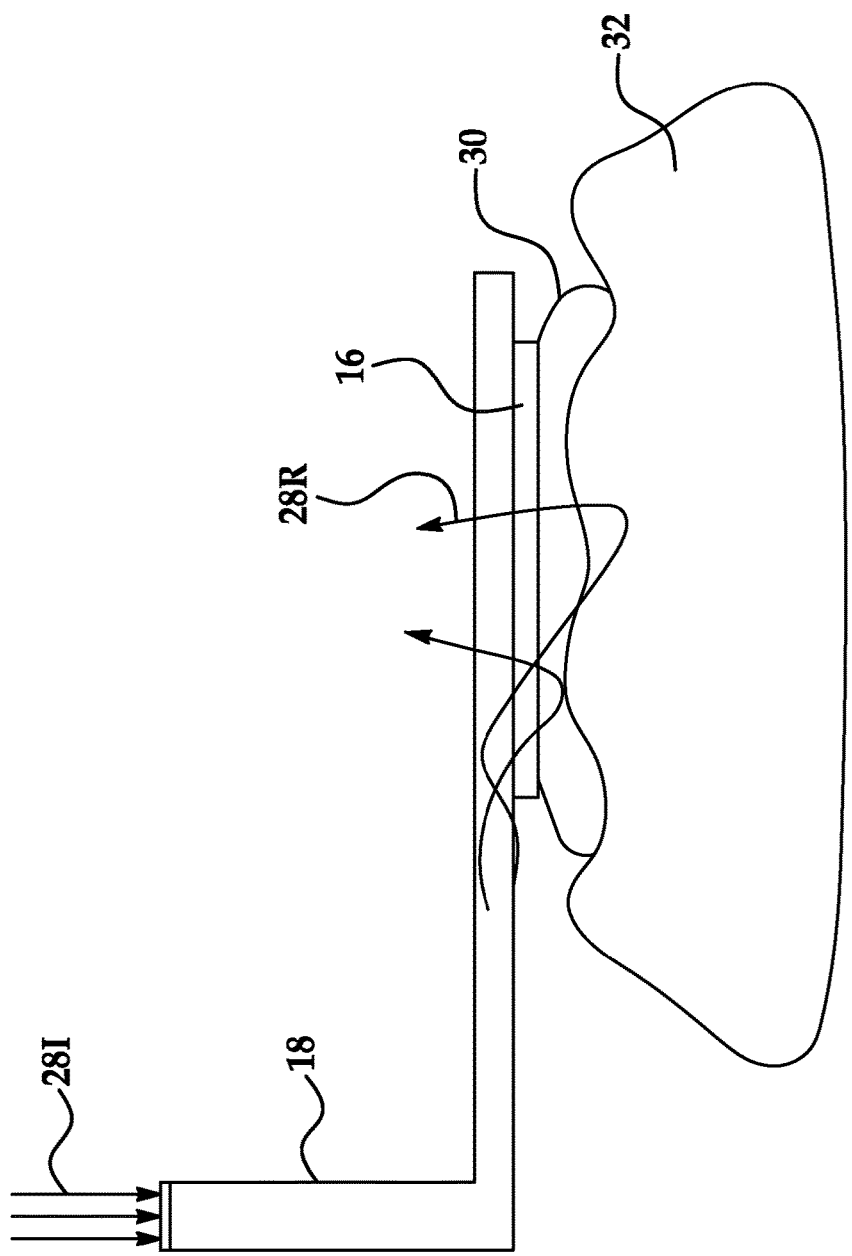
FIG. 4 illustrates the light transmission with the light pipe to the surface to be imaged with a light coupling fluid between the scratch resistant window and the surface according to an embodiment of the invention.

FIG. 4 illustrates the light transmission of incident light 28I from a light source on the mobile device (not shown) with the light pipe 18 to the surface to be imaged 32 with a light coupling fluid 30 between the scratch resistant window 16 and the surface 32 according to an embodiment of the invention. The reflected light 28R illuminates the surface 32.

The foregoing description is illustrative of particular embodiments of the invention, but is not meant to be a limitation upon the practice thereof. The following claims, including all equivalents thereof, are intended to define the scope of the invention.

The invention claimed is:

1. A digital dermatology microscope system for use with a mobile device, said system comprising:
 a case configured to fit on said mobile device;
 a microscope module with a movable slide connection to said case;
 wherein said case positions said microscope module in a first position over a camera and a light source built-in said mobile device, and away from said camera and said light source in a second position; and
 wherein in the first position said microscope module is configured to directly contact an outermost epidermal surface of a patient's skin for microscopic observation of the surface and features below the surface of the skin.

2. The system of claim 1 wherein said microscope module further comprising a scratch resistant window on an exterior surface of said microscope module.

3. The system of claim 2 wherein said microscope module further comprising a lens barrel positioned over said camera in said first position and a light pipe with a proximal end and a distal end, the proximal end between said lens barrel and said scratch resistant window, and the distal end over said light source in said first position, with light exiting the proximal end adapted to illuminate the surface to be viewed.

4. The system of claim 3 wherein said microscope module further comprises: a felt like light excluder ring at a sliding interface between said lens barrel and said camera.

5. The system of claim 3 wherein said scratch resistant window is a sapphire cover glass.

6. The system of claim 3 wherein said light pipe is made of a polycarbonate material.

7. The system of claim 1 wherein said case is made from a plastic or a composite material.

8. The system of claim 1 further comprising a calibrated reticle.

9. The system of claim 1 further comprising a fluid interface between said microscope module and a surface to be imaged.

10. The system of claim 9 wherein said fluid interface is a droplet of clear refractive index matched liquid.

11. The system of claim 9 wherein said fluid interface is water or ultrasound gel.

12. A method of microscopic observation of a patient's skin, said method comprising:
    locating a surface of the patient's skin to be imaged;
    applying a fluid interface to said surface to be imaged;
    placing a microscope module in direct contact with said surface, said microscope module having a lens barrel positioned over a camera of a mobile device and a light pipe positioned over a light source of the mobile device, wherein said light pipe is configured to direct light from the light source to illuminate said surface; and
    taking an image of said surface.

13. The method of claim 12 further comprising controlling said microscope module with an application program (app) running on said mobile device.

14. The method of claim 13 wherein said application program controls a range of magnification of said microscope module.

15. The method of claim 14 wherein said range of magnification ranges between 1× and 200×.

16. The method of claim 13 wherein said application facilitates observation, image capture and simultaneous storage of image data with a single touch of a user interface on said mobile device.

17. The method of claim 14 wherein said application is configured to email or deposit an image obtained with said digital microscope system in a secure electronic data management system.

18. The method of claim 15 wherein a zoom option allows a user to zoom in on any object in an image rather than just a center portion of the image.

19. The method of claim 16 wherein said application includes an option for full auto focus and manual focus.

* * * * *